(12) United States Patent
Zhou et al.

(10) Patent No.: US 6,746,597 B2
(45) Date of Patent: Jun. 8, 2004

(54) SUPPORTED NOBLE METAL NANOMETER CATALYST PARTICLES CONTAINING CONTROLLED (111) CRYSTAL FACE EXPOSURE

(75) Inventors: Bing Zhou, Cranbury, NJ (US); Michael Rueter, Plymouth Meeting, PA (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 6 days.

(21) Appl. No.: 10/066,289

(22) Filed: Jan. 31, 2002

(65) Prior Publication Data

US 2003/0232721 A1 Dec. 18, 2003

(51) Int. Cl.$^7$ .................. C01G 35/06; C07C 4/12; B01J 21/16; B01J 23/02; B01J 23/40
(52) U.S. Cl. .............. 208/138; 585/483; 585/485; 585/489; 502/74; 502/84; 502/183; 502/184; 502/185; 502/326; 502/327; 502/328; 502/330; 502/331; 502/332; 502/333; 502/334; 502/335; 502/336; 502/337; 502/338; 502/339
(58) Field of Search ............... 502/74, 185, 326, 502/327, 328, 331, 332, 333, 334, 335, 336, 339, 350, 355, 415, 439, 84, 330, 337, 338, 183, 184; 208/138; 585/483, 485, 489

(56) References Cited

U.S. PATENT DOCUMENTS

| | | | | |
|---|---|---|---|---|
| 3,625,879 A | * | 12/1971 | Horne et al. ............ 585/251 |
| 3,644,200 A | * | 2/1972 | Young ................. 208/120.15 |
| 3,686,340 A | * | 8/1972 | Patrick et al. ............ 585/485 |
| 3,700,745 A | * | 10/1972 | Kovach et al. ............ 585/485 |
| 4,028,274 A | * | 6/1977 | Kunz ....................... 252/447 |
| 4,053,531 A | * | 10/1977 | Kerr et al. .............. 585/476 |
| 4,157,355 A | * | 6/1979 | Addison ................. 585/321 |
| 4,247,730 A | * | 1/1981 | Brunelle ................. 585/489 |
| 4,476,242 A | * | 10/1984 | Puskas et al. ............ 502/185 |
| 4,713,363 A | * | 12/1987 | Hucul ..................... 502/262 |
| 5,024,905 A | * | 6/1991 | Itoh et al. ................ 429/44 |
| 5,061,671 A | * | 10/1991 | Kitson et al. ............ 502/185 |
| 5,096,866 A | * | 3/1992 | Itoh et al. ................ 502/101 |
| 5,132,480 A | * | 7/1992 | Tsutsui et al. ........... 585/489 |
| 5,698,488 A | * | 12/1997 | Birbara et al. ........... 502/325 |
| 5,767,036 A | * | 6/1998 | Freund et al. ............ 502/185 |
| 5,961,948 A | * | 10/1999 | Wanngard ............... 423/584 |
| 6,040,490 A | * | 3/2000 | Ichioka et al. ............ 585/475 |
| 6,069,286 A | * | 5/2000 | Wu et al. ................. 585/485 |
| 6,090,858 A | | 7/2000 | El-Sayed |
| 6,168,775 B1 | | 1/2001 | Zhou |
| 6,194,338 B1 | * | 2/2001 | Andolfatto et al. ....... 502/101 |
| 6,518,217 B2 | * | 2/2003 | Xing et al. .............. 502/230 |
| 6,534,661 B1 | * | 3/2003 | Zhou et al. .............. 549/531 |

FOREIGN PATENT DOCUMENTS

EP 084362 A1 9/1998

* cited by examiner

*Primary Examiner*—Cam N. Nguyen
(74) *Attorney, Agent, or Firm*—Workman Nydegger

(57) ABSTRACT

A noble metal nanometer-sized catalyst composition is described along with the method for preparation of the composition. The crystal face of the catalyst contains a preponderance of (111) type crystal phase exposure. The crystal phase exposure is controlled by sequestering the noble metal cation before deposition on a catalyst support. Controlled catalyst face exposition combined with the nanometer scale of the catalyst increases the catalyst selectivity and activity, particularly for hydrogenation and dehydrogenation reactions.

59 Claims, 1 Drawing Sheet

SURFACE STRUCTURE OF DIFFERENT Pd CRYSTAL PHASES a. (110)  b. (100)  c. (111)

SURFACE STRUCTURE OF DIFFERENT Pd CRYSTAL PHASES

FIRST LAYER   SECOND LAYER   THIRD LAYER

SUPPORTED NOBLE METAL NANOMETER CATALYST PARTICLES CONTAINING CONTROLLED (111) CRYSTAL FACE EXPOSURE

FIELD OF THE INVENTION

This invention relates to supported nanometer-sized catalytic crystal particle compositions of noble metals wherein the exposed faces of the nanometer-sized catalyst particles comprise predominantly crystal planes of the (111) type. The invention further relates to the method of preparing the nanometer-sized catalyst particles having predominantly (111) crystal planes as well as to the discovery of the particularly efficacious properties of these noble metal nanometer-sized particles in the catalysis of reactions such as hydrogenation, dehydrogenation and fuel cell applications

BACKGROUND OF THE INVENTION

In commercial practice, a large number of chemical transformations are accomplished using heterogeneous catalysts where the active component of the catalyst is a metal, often deposited on a support material. An important class of catalysts are those which utilize noble metals including the platinum group of metals (platinum, palladium, rhodium, ruthenium, iridium, and osmium) as well as silver, gold and rhenium. In comparison to other catalytic materials, the noble metals often have especially high activity and selectivity and are, therefore, frequently preferred over other catalyst materials.

Because of their ability to facilitate the dissociative adsorption, surface reaction, and recombination/desorption of hydrogen, noble metals can catalyze a wide range of commercially important reactions, particularly the transfer, reaction or activation of hydrogen. These reactions and associated processes include various hydrogenations and related reactions such as methanation, carbonylation, hydroformylation, reductive alkylation, amination, hydrosilation, ammonia synthesis, oil or fat hardening and the like. Noble metal catalysis is also particularly useful in dehydrogenation reactions such as catalytic reforming, dehydrohalogenation reactions, steam reforming, partial oxidation and the production of gases including synthesis gas, hydrogen, carbon monooxide, carbon dioxide and the like. Noble metals are also used in important electrochemical processes such as fuel cell applications to carry out the dissociative adsorption of hydrogen and oxygen on the noble metal electrode, leading to the reaction of hydrogen with oxygen and the production of an electric current and by-product water.

Despite their wide-ranging effectiveness in catalytic chemical processes, noble metal catalysts have critical liabilities as the catalyst of choice for commercial chemical operations. Noble metals are extremely high cost and high catalyst attrition rates in a given chemical process can negate the choice of noble metals as a preferred catalyst for that process. Their high cost also requires that their superior catalytic activity be sufficiently high compared to other catalyst choices to justify their use. To ameliorate the cost disadvantage, those skilled in the art can employ noble metals catalyst as small particles whereby the overall efficiency of the catalyst is improved. This results in the greatest exposure of active noble metal surface areas for a given loading and offers the greatest noble metal utilization.

Nevertheless, even when methods are available to produce very small particles to improve efficiency and control catalyst costs, these particles are often unstable. The high surface energy of the small particles tends to cause migration and agglomeration of the metal particles such that a catalyst which initially comprises very small particles and high noble metal surface area can lose surface area. Improved methods are needed to prevent this migration and agglomeration of catalyst particles.

Another critical problem associated with noble metal catalysis is catalyst leaching by dissolution of noble metal into the surrounding liquid reaction medium. Because of the high cost of noble metals, leaching can be a very costly burden on overall process economics as it leads to a lose of catalyst efficiency and necessitates an enhanced catalyst recovery process Typical noble metal catalysts are known to have leaching rates of 5–10% per year or higher; that represents a substantial economic burden on any catalytic process. Accordingly, those skilled in the art have long sought improved methods to anchor noble metal particles on substrate surfaces in smaller particle sizes that will neither agglomerate nor experience prohibitive catalyst leaching rates.

Yet another problem with the current state-of-the-art for noble metal catalysts is the inability to properly control the active site distribution on the catalytic surface. For any particular catalyzed reaction, it is known that only certain types of surface active sites are, indeed, catalytically active and preferred for the selected catalyzed reaction. A key determining locus that defines the controlling characteristics of the surface active sites is the noble metal crystal face. Small metal crystals generally expose mainly low-order crystal faces, such as (100), (110), and (111). Normally, the most desired active sites for a given reaction are on only one of these faces so that a catalytically very active catalyst particle would be one that preferably contains a preponderance of that particular active crystal face. Unfortunately, prior art catalyst manufacturing methods produce catalysts containing crystal faces having a mixture of all of these preferred and non-preferred crystal faces. This reduces the efficiency of noble metal utilization and can also lead to non-selective reactions that are catalyzed by the non-preferred active sites on the crystal face. Therefore, the utility and efficiency of noble metal catalysts would be improved by introducing catalyst preparation methods that control the distribution of the crystal face exposition of noble metal particles to favor those configurations most effective in catalyzing the selected reaction.

SUMMARY OF THE INVENTION

Addressing the aforementioned problems to overcome them and provide an improved catalyst for selected types of reactions has led to the discovery that supported nanometer scale noble metal particles containing a preponderance of (111) type of crystal phase upon the crystal face of the catalyst particles are especially effective catalysts for reactions that fall within the general classes of hydrogenation or dehydrogenation reactions, including half-cell electrochemical reactions as carried out in hydrogen/oxygen fuel cells for the independent production of electricity. The support material for the noble metal catalyst is preferably a porous material such as porous alumina or carbon black.

The invention provides both an improved supported noble metal catalyst comprising nanometer scale particles applicable to selected reactions and a method for producing the improved catalyst. The particles of the invention preferably comprise noble metal particles of less than 5 nanometers, more preferably less than 2 nanometers. An especially important aspect of the invention is the discovery that the most effective crystal face of the noble metal particles useful in the selective reactions have a predominant exposure of the (111) type of crystal phase. Yet another important aspect of the invention is the finding that the nanometer scale noble metal particles are anchored to the surface of a supporting substrate in a way that prevents their subsequent migration and agglomeration. As a consequence of these properties, the catalyst of the invention is advantageously useful over the prior art for many important catalytic reactions. Depending on the application or reaction-type, these advantages include: (a) a higher activity derived from the increased noble metal surface areas of the extremely small crystallites containing the selective exposure of predominantly the (111) type of crystal phase upon the noble metal faces; (b) higher selectivity due to the selective exposure of the (111) type of crystal phase upon the noble metal crystal faces, (c) an improved catalytic stability and life due to the anchoring of the noble metal crystallites.

The method preparing the supported noble metal catalyst having nanometersized crystal particles with a preponderance of (111) type of crystal phase on the face of the noble metal particles includes the steps of:

preparing a solution of a noble metal salt and a metallo-organic sequestering agent;

treating the solution of sequestered noble metal with a reducing agent;

impregnating a catalyst support with the reduced noble metal solution;

drying the impregnated support; and activating the catalyst by reducing the dried impregnated support to yield the nanometer-sized noble metal catalyst having a preponderance of 111 type of crystal phase on the face of the noble metal particles.

Depending on the metallo-organic sequestering agent employed to prepare the initial sequestered noble metal solution, treatment of the solution with a reducing agent in a second step may not be necessary and the noble metal sequestered solution may be used directly to impregnate the catalyst support prior to activation. Generally, before impregnating the catalyst support material, in the process of the invention it is not necessary to hydrogenate sequestered noble metal solutions prepared by reaction with small molecule metallo-organic sequestering agents.

As to the types of catalytic reactions to which the catalyst of the invention can be applied, hydrogenation is a preferred choice and includes the full scope of hydrogenation reactions as applied to acyclic and cyclic olefinic compounds, carbonyls, aromatic compounds, and oxides of nitrogen, sulfur, phosphorous, carbon and the like. Applicable catalytic dehydrogenation reactions especially include reforming of naphtha, cycliization of aliphatic compounds and alkane dehydrogenation to form alkenes. The catalyst is also useful in steam reforming of hydrocarbons, partial oxidation and the like.

DETAILED DESCRIPTION OF THE INVENTION

Figure 1:
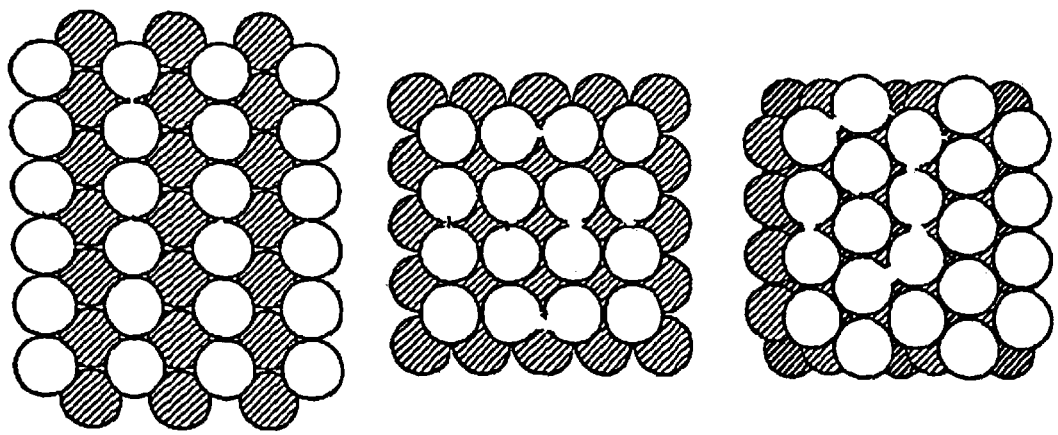
FIGS. 1a, 1b and 1c depict the atomic surface structure (110, 100 & 111) of different crystal phases of noble metal catalyst surfaces (Pt).
Figure 1:
Figure 1:
Figure 1:

Applicants' issued patent U.S. Pat. No. 6,168,775 B1, incorporated herein by reference in its entirety, is instructive for the reader as to the significant role the crystal phase exposition (110) of a noble metal catalyst can assume in determining the selectivity of a chemical reaction, e.g., hydrogen peroxide formation from hydrogen and oxygen reactants, even over the thermodynamically favored selectivity of water as the end-product of the reaction. Pursuing this insight further into the phenomena of noble metal catalysis of hydrogen-based reactions, applicants have discovered that when the geometry of the crystal surface of a noble metal catalyst particle is controlled to present a (111) crystal plane, i.e., a plane wherein each metal atom on the surface is surrounded by six other metal atoms, the catalyst is highly selective for the propagation of certain reactions including hydrogenation, dehydrogenation, partial oxidation and the like.

Referring to FIGS. 1a–1c, the distinction of applicants' discovery is illustrated. Applicants' have discovered that, although the chemical composition of the noble metal catalysts depicted in FIGS. 1a–1c is identical, the differing crystallographic structures of the active catalyst surface of 1a–1c play a determining role in establishing the comparative effectiveness or selectivity of the catalyst for different types of hydrogen-based reactions. Whereas, in U.S. Pat. No. 6,168,775B1 crystal phase exposition (110) is selective for the formation of hydrogen peroxide from hydrogen and oxygen, the instant invention teaches that crystal phase exposition (111) is selective and preferable over (110) for hydrogenation and dehydrogenation reactions, among others.

However noteworthy the foregoing discovery of the special efficacy of crystal phase exposition (111) is for reductive reactions, absent a means to routinely and reliably prepare noble metal catalyst particles with a preponderance of (111) faces, the discovery would remain of academic interest, but also remain commercially sterile. Therefore, applicants have diligently bent themselves to the pursuit of economically reasonable methods for preparing noble metal catalyst particles with the assigned exposition to convert their discovery to a practical commercial reality. They have discovered that by treating noble metal cations with select, small polyfunctional cation sequestering organic molecules or metal sequestering nonlinear organic and inorganic oligomers, the resultant noble metal cationic complex can be deposited on a support material and converted, preferably by further reduction, to provide the supported noble metal crystalline nanometer-size particles of the invention containing a preponderance of the preferred (111) crystal face exposition. Preferably, acids such as glycolic acid are used to form the metalloorganic complex onto a catalyst support and reduced to yield the active noble metal catalyst of the invention.

The recovered catalyst of the invention, as described above, demonstrates both high selectivity and activity for the preferred reduction reactions. It is thought that the sizing of the noble metal catalytic particles in the nanometer range(<5 nanometers) is the contribution largely responsible for the increase in catalytic activity since more catalytically active site are created. However, the concomitant and concurrent advantage of the catalyst in reaction selectivity must be assigned to applicants' discovery of the significant importance of establishing a preponderance of (111) type crystal planes on the catalytic face. The combination of both enhanced activity and high selectivity succeeds in distinguishing applicants' invention over prior art catalytic processes.

The conversion processes of the invention are conducted using a specially prepared phase-controlled supported noble metal catalyst from which the most important advantages of this process are derived. The catalyst consists of an inorganic oxide or carbon support holding nanometer-sized crystallites of one or more metal components, where the metal or metals normally include at least one noble (platinum-group) metal such as palladium, in combination with one or more of platinum, rhenium, rhodium, ruthenium, osmium, iridium, gold, or combinations thereof. Other metal constituents such as nickel, tin, copper, iron, and the like, may be included either individually or in combination. The amount of noble metal constituents will typically be 0.01 to 10% of the total catalyst weight, but preferably 0.1 to 5% by weight. Other components may also be included in amounts of 0.01 to 20% by weight, depending upon the selection and function of the additional component. These other components include transition metals, alkali metals, alkali earth's, rare earth's and non-metals.

The noble metal particles are deposited on carbon or inorganic metal oxide support, minerals, polymeric materials and the like. Examples of noble metal catalyst supports are activated carbon, carbon black, fluoridated carbon, alumina, bentonite, clay, diatomaceous earth, zeolite, silica, zirconia, magnesia, titania, and the like, and also mixtures of those. The support should preferably be a porous material having a surface area of more than 20 m2/g, and more preferably more than 50 m2/g, up to 500 m2/gm. Preferably, the support material comprises at least 90% by weight of the total catalyst weight. Any material that can serve as a useful support for a heterogeneous catalyst may be used as a support material for the catalyst of the invention.

The noble metal crystallites are preferably deposited on the substrate support material using a small molecule binding agent or sequestering agent such as glycolic acid and non-linear oligomeric metal sequestering agents which disperses the deposited metal into the desired nanometer-sized particles and strongly bonds the particles to the surface. It has been found that this controlled deposition method allows metal crystallites to be deposited with a high selectivity for exposing specific (111) metal crystal faces. It is believed that the (111) crystal face exposure is somehow favored by employing as a noble metal cation sequestering agent those chemicals that are relatively structurally unrestricted as to the form they can assume when deposited on the support material. When deposited, the sequestration complex on the substrate is activated by reduction with hydrogen. These several features of the metal deposition method produce a catalyst with properties that are highly advantageous for use in the application processes of the invention. The unique features include:

producing nanometer-sized particles which contributes to especially high catalyst activity;

controlled exposition of known metal crystal faces promotes the selectivity of the catalytic reaction toward the desirable products;

strong bonding of the metal crystallites to the substrate surface prevents agglomeration of metal particles into larger structures, which would cause the desirable high activity of the catalyst to be lost. Further, the strong bonding substantially prevents the attrition of the active metal components into the surrounding liquid medium during use of the catalyst.

The following exposition teaches the specific design and preparation of the catalyst of the invention as potentially applied to a preferred application hydrocarbon reforming.

GENERAL EXAMPLE 1

Catalyst Design, Preparation & Application

Since catalytic reforming is essentially the breaking of carbon-hydrogen bonds to form carbon-oxygen and hydrogen—hydrogen bonds, the active catalyst should have a structure with active sites adjacent to each other in order to carry out the prescribed reaction of bond cleavage and exchange. Referring to FIG. 1, it is observed that the platinum (Pt) crystal face (110) contains a structure wherein each Pt atom is surrounded only by two adjacent Pt atoms on the crystal surface layer. For the crystal face (100), each Pt atom is adjacent to 4 other Pt atoms. But for crystal face (111), each Pt atom is adjacent to 6 other Pt atoms. Accordingly, it is apparent that crystal face (111) will provide more active sites on the surface for breaking C-H bonds for reforming methane or other hydrocarbons. The adjacent characteristics of the sites of (111) will also improve the efficiency of the reforming reaction for recombining the adjacent hydrogen atoms to form hydrogen molecules and combining carbon plus oxygen from adjacent sites to form carbon oxide molecules, principally carbon monoxide.

To implement the findings of the preceding paragraph and achieve a more efficient hydrocarbon reforming process, a controlled dispersion method is used to prepare the requisite noble metal catalyst such as Pt having a catalyst particulate face abundant in type (111) crystal phase exposure. But to augment the advantages of the type (111) crystal phase exposure, the supported catalyst particles are prepared to exhibit catalyst particles of not greater than 5 nanometers in size, preferably not greater than 2 nanometers. A first step is the preparation of a solution of a Pt salt. The Pt salt is reacted with a control or binding agent to form an organo metallic complex with the noble metal. The control agent can be a small organic molecule containing at least two functional groups to sequester the Pt moiety. Functional groups such as OH or COOH are useful. Alternatively, the control agent can be a branched, cross-linked or non-linear sequestering ionic polymer or oligomer capable of binding with the Pt moiety. The control or sequestering agent used in the invention serves two functions: first, it binds or holds the Pt for deposition onto the catalyst; and secondly, the control agent also forms intermolecular hydrogen bonds with the support material to provide a network as a template base for Pt (111) phase formation. The holding structure of the control agents prevents Pt atoms from agglomerating to form large particles. Typically useful control agents include small molecules such as glycolic acid or citric acid and salts thereof. For polymeric control agents branched or cross-linked polyacrylic acid or their salts are useful.

The described controlled dispersion method produces a catalyst with nanometer-sized noble metal particles having a thin catalytic layer on the support surface.

SPECIFIC EXAMPLE 2

For preparing a Pt catalyst having a (111) crystal phase surface a desired amount of platinic chloride is dissolved in water. A phase control agent solution such as gycolic acid solution is mixed with the platinic chloride solution in a ratio of metal to agent between 1:0.5 and 1:10. The combined solution is purged with nitrogen and then reduced with hydrogen. The formed organo-metallic complex, i.e., platinum glycolate is deposited on a catalyst support such as alumina by impregnation. The network of glycolate holds the Pt during impregnation to provide dispersion with a (111) crystal phase pattern. The obtained sample was dried in air and activated by a reduction in hydrogen at temperatures 100–400 degrees C. The result is a catalyst with Pt(111) crystal phase surface exposition. Preferably, the final catalyst has a Pt loading between 0.01 to 5% by weight; more preferably 0.01 to 1% by weight.

The catalyst of the invention is useful for the catalysis of a variety of chemical reactions. It can be used, for example, for the catalysis of hydrogenation reactions including hydrogenation of olefins, acetylenes, carbonyls, aromatics, carboxylic acids, anthraquinones, imines, nitriles, nitro and nitroso compounds, pyridines, carbon monoxide and carbon dioxide and the like.

The catalyst can also be useful for various dehydrogenation reactions including catalytic reforming of naphtha, cyclization and/or aromatization of aliphatic hydrocarbons, alcohol dehydrogenation. The catalyst can be used in steam reforming of hydrocarbons partial oxidation, and the like. Applicable feedstocks for these reactions and the catalyst of the invention include methane, gasoline, kerosene, diesel fuels, methanol and ethers. These reactions are useful for the production of synthesis gas and may be applied to applications such as fuel cells.

The catalyst of the invention can be used in any of a variety of practical reactor types, depending on the specific application. Any reactor type known to those skilled in the art can be used.

What is claimed is:

1. A supported noble metal catalyst wherein the noble metal comprises nanometer-sized crystal particles contained on a support material within a matrix comprising a particle-to-support control and binding agent, said particles having a preponderance of (111) type of crystal phase on the face of the noble metal particles.

2. The catalyst of claim 1 wherein the support material includes a porous support material.

3. The catalyst of claim 1 wherein the support material is selected from the group consisting of activated carbon, carbon black, fluoridated carbon, alumina, bentonite, clays, diatomaceous earth, synthetic and natural zeolites, magnesia, titania, and polymeric materials.

4. The catalyst of claim 1 wherein the support material has a surface area of at least 20 square meters per grain.

5. The catalyst of claim 1 wherein at least one-half of the crystal phases of the face of the noble metal particles comprise the (111) type of crystal phase.

6. The catalyst of claim 1 wherein the control and binding agent comprises a metallo-organic sequestering agent.

7. The catalyst of claim 6 wherein the sequestering agent comprises polyfunctional low molecular weight carboxylic acids and/or branched polyfunctional polymeric carboxylic acids.

8. The catalyst of claim 6 wherein the sequestering agent comprises glycolic acid.

9. The catalyst of claim 1 wherein the particle size of the nanometer-sized crystals is less than 5 nanometers.

10. The catalyst of claim 1 wherein the particle size of the nanometer-sized crystals is less than 2 nanometers.

11. The catalyst of claim 1 wherein the noble metal is selected for the group consisting of platinum, palladium, rhenium, rhodium, ruthenium, osmium, iridium, silver, and gold.

12. The catalyst of claim 1 wherein the noble metal comprises 0.01% to 10% of the total catalyst weight.

13. The catalyst of claim 12 wherein the noble metal comprises 0.1% to 5% of the total catalyst weight.

14. The catalyst of claim 1 wherein said particles further include metals other than noble metals including iron, nickel, copper and tin.

15. The catalyst of claim 1 wherein the noble metal particles further comprise at least one component selected from the group consisting of transition metals, alkali metals, alkaline earth metals, rare earth metals, and non-metals.

16. A method of catalytically treating a hydrocarbon feedstock, comprising:
   mixing or contacting the hydrocarbon feedstock with the catalyst of claim 1; and
   performing at least one catalytic treatment selected from the group consisting of:
   (a) catalytic reforming of naphtha;
   (b) cyclization of an aliphatic hydrocarbon;
   (c) aromatization of an aliphatic hydrocarbon;
   (d) hydrogenation of a hydrocarbon;
   (e) dehydrogenation of a hydrocarbon;
   (f) steam reformation of a hydrocarbon;
   (g) partial oxidation of a hydrocarbon;
   (h) production of synthesis gas; and
   (i) dissociative adsorption of hydrogen and oxygen.

17. The method of claim 16, wherein the hydrocarbon feedstock comprises at least one of methane, gasoline, kerosene, diesel fuel, methanol, or ether.

18. A method for preparing a supported noble metal catalyst having nanometer-sized crystal particles, said particles having a preponderance of (111) type of crystal phase on the face of the noble metal particles, comprising:
   (a) preparing a solution of a noble metal salt and a metallo-organic sequestering agent;
   (b) treating the solution of sequestered noble metal with a reducing agent;
   (c) impregnating a catalyst support with the reduced noble metal solution; and
   (d) activating the catalyst by reducing the impregnated support to yield the nanometer-sized noble metal catalyst having a preponderance of (111) type of crystal phase on the face of the noble metal particles.

19. The method of claim 18 wherein the solution is an aqueous solution of noble metal and the sequestering agent comprises glycolic acid with a ratio of metal to agent of between 1:0.5 and 1:10.

20. The method of claim 18 wherein the impregnated support is reduced by hydrogenation at a temperature between 100 and 400 degrees C.

21. The method of claim 18 wherein the supported activated catalyst has a noble metal loading of between 0.01 and 10 weight percent.

22. The method of claim 18 wherein the support is selected from the group consisting of activated carbon, carbon black, fluoridated carbon, alumina, bentonite, clays, diatomaceous earth, synthetic and natural zeolites, magnesia, titania, and polymeric materials.

23. The method of claim 18 wherein the solution of sequestered noble metal is treated with a reducing agent comprising hydrogen gas.

24. The method of claim 18 wherein the solution comprising noble metal salt and a metallo-organic sequestering agent is treated with a reducing agent comprising hydrogen gas.

25. A supported metal catalyst, comprising:
   a support material;
   a plurality of metal catalyst particles disposed on the support material, the catalyst particles having a preponderance of (111) type of crystal phase on the face of the metal catalyst particles; and
   a control and binding agent comprising at least one type of polymer, oligomer, or organic compound that binds the metal catalyst particles to the support material.

26. The supported metal catalyst of claim 25, wherein the support material is selected from the group comprising activated carbon, carbon black, fluoridated carbon, alumina, bentonite, clays, diatomaceous earth, synthetic zeolites, natural zeolites, magnesia, titania, and polymeric materials.

27. The supported metal catalyst of claim 25, wherein at least half of the crystal phases of the face of the metal catalyst particles comprise the (111) type of crystal phase.

28. The supported metal catalyst of claim 25, wherein the metal catalyst particles are less than 5 nanometers in size.

29. The supported metal catalyst of claim 25, wherein the metal catalyst particles are less than 2 nanometers in size.

30. The supported metal catalyst of claim 25, wherein the metal catalyst particles comprise at least one noble metal selected from the group consisting of platinum, palladium, rhenium, rhodium, ruthenium, osmium, iridium, silver, and gold.

31. The supported metal catalyst of claim 30, wherein the metal catalyst particles comprise 0.01% to 10% by weight of the at least one noble metal.

32. The supported metal catalyst of claim 30, wherein the metal catalyst particles comprise 0.1% to 5% by weight of the at least one noble metal.

33. The supported metal catalyst of claim 25, wherein the metal catalyst particles comprise at least one metal selected from the group consisting of nickel, tin, copper, and iron.

34. The supported metal catalyst of claim 25, wherein the metal catalyst particles comprise at least one transition metal.

35. The supported metal catalyst of claim 25, wherein the metal catalyst particles comprise at least two different types-of metals.

36. The supported metal catalyst of claim 25, wherein the control and binding agent is selected from the group consisting of small organic molecules, branched, cross-linked, or non-linear ionic polymers; branched, cross-linked, or non-linear oligomers; and combinations thereof.

37. The supported metal catalyst of claim 25, wherein the control and binding agent is a small organic molecule containing at least two functional groups.

38. The supported active metal catalyst of claim 37, wherein the at least two functional groups comprise an OH group and/or a COOH group.

39. The supported metal catalyst of claim 37, wherein the control agent comprises a low molecular weight polyfunctional carboxylic acid and/or a branched polyfunctional polymeric carboxylic acid.

40. The supported metal catalyst of claim 25, wherein the control agent is selected from the group comprising glycolic acid, citric acid, branched or cross-linked polyacrylic acid, combinations thereof, and salts thereof.

41. The supported metal catalyst of claim 25, wherein the metal catalyst particles comprise an additional component selected from the group consisting of alkali metals, alkaline earth metals, and non-metals.

42. A method of using the supported metal catalyst of claim 25, comprising contacting one or more reactants with the supported metal catalyst so as to yield one or more desired reaction products.

43. The method of claim 42, wherein the one or more reactants are hydrogenated to yield the one or more desired reaction products.

44. The method of claim 42, wherein the one or more reactants are selected from the group consisting of olefins, acetylenes, carbonyls, aromatics, carboxylic acids, anthraquinones, imines, nitriles, nitro compounds, nitroso compounds, pyridines, carbon monoxide, and carbon dioxide.

45. The method of claim 42, wherein the one or more reactants are dehydrogenated to yield the one or more desired reaction products.

46. The method of claim 45, wherein the one or more desired reaction products are selected from the group consisting of reformed naphtha, cyclized aliphatic hydrocarbons, aromatized aliphatic hydrocarbons, compounds with dehydrogenated alcohols.

47. The method of claim 42, wherein the one or more reactants are selected from the group consisting of methane, gasoline, kerosene, diesel fuel, methanol and ether.

48. The method of claim 42, wherein the supported metal catalyst catalyzes a at least one half-cell electrochemical reaction in a hydrogen/oxygen fuel cell, the at least one half-cell electrochemical reaction comprising at least one of a hydrogenation or a dehydrogenation reaction.

49. A method of manufacturing a supported metal catalyst, comprising:
   (a) preparing an intermediate catalyst complex by reacting together:
      (i) a plurality of cations of metal catalyst atoms; and
      (ii) a control and binding agent comprising a plurality of molecules selected from the group consisting of polymers, oligomers, and organic compounds;
   (b) contacting the intermediate catalyst complex with a support material; and
   (c) removing a portion of the control agent to expose a portion of the metal catalyst atoms, thereby yielding a supported catalyst comprising a plurality of metal catalyst particles (i) that are bonded to the support material by a remaining portion of the control and binding agent and (ii) that have a preponderance of (111) type of crystal phase on the face of the metal catalyst particles.

50. The method of claim 49, wherein the metal catalyst atoms comprise at least one noble metal selected from the group comprising platinum, palladium, rhenium, rhodium, ruthenium, osmium, iridium, silver, and gold.

51. The method of claim 49, wherein the metal catalyst atoms comprise at least one of nickel, tin, copper, or iron.

52. The method of claim 49, wherein (a) comprises reacting the cations of the metal catalyst atoms and control agent in a solution.

53. The method of claim 49, further comprising bonding a portion of the control agent with the support material.

54. The method of claim 49, wherein bonding a portion of the control agent with the support material yields an intermediate composition comprising a liquid and said catalyst complex bonded to said support material, the method further comprising drying the intermediate composition.

55. The method of claim 49, wherein (c) comprises reducing the portion of control agent.

56. The method of claim 49, wherein (c) comprises hydrogenating the portion of the control agent.

57. The method of claim 49, further comprising heat treating the supported catalyst obtained in (c) at a temperature in a range of from about 100° C. to from about 400° C.

58. The method of claim 49, wherein the metal catalyst particles comprise at least two different catalyst atoms.

59. The method of claim 49, wherein the intermediate catalyst complex formed in (a) comprises a molar ratio of catalyst atoms to control agent in a range of about 1:0.5 to about 1:10.

\* \* \* \* \*

UNITED STATES PATENT AND TRADEMARK OFFICE
CERTIFICATE OF CORRECTION

PATENT NO. : 6,746,597 B2
DATED : June 8, 2004
INVENTOR(S) : Bing Zhou and Michael Reuter It is certified that error appears in the above-identified patent and that said Letters Patent is hereby corrected as shown below:

Column 2,
Line 14, after "recovery process" insert -- . --

Column 4,
Line 37, after "sequestering" change "nonlinear" to -- non-linear --

Column 7,
Line 37, after "meters per" change "grain" to -- gram --

Column 9,
Line 28, after "different types" remove "-"

Column 10,
Line 13, after "catalyzes" change "a" to -- an --
Line 56, after "100° C" remove "."

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,746,597 B2
DATED : June 8, 2004
INVENTOR(S) : Bing Zhou and Michael Rueter It is certified that error appears in the above-identified patent and that said Letters Patent is hereby corrected as shown below:

Column 4,
Line 57, change "site" to -- sites --.

Column 10,
Line 46, change "49" to -- 53 --.

Signed and Sealed this

Twentieth Day of September, 2005

JON W. DUDAS
*Director of the United States Patent and Trademark Office*

UNITED STATES PATENT AND TRADEMARK OFFICE
CERTIFICATE OF CORRECTION

PATENT NO.        : 6,746,597 C1                                         Page 1 of 1
APPLICATION NO.   : 90/007642
DATED             : November 21, 2006
INVENTOR(S)       : Zhou et al.

It is certified that error appears in the above-identified patent and that said Letters Patent is hereby corrected as shown below:

EX PARTE REEXAMINATION CERTIFICATE (5612th)
Title Page, Item 73, change "Morgan Stanley & Co. Incorporated, New York, NY (US)" to --Headwaters Nanokinetix, Inc. Lawrenceville, NJ (US)--

Signed and Sealed this

Twentieth Day of March, 2007

JON W. DUDAS
*Director of the United States Patent and Trademark Office*

(12) EX PARTE REEXAMINATION CERTIFICATE (5612th)
United States Patent
Zhou et al.

(10) Number: US 6,746,597 C1
(45) Certificate Issued: Nov. 21, 2006

(54) SUPPORTED NOBLE METAL NANOMETER CATALYST PARTICLES CONTAINING CONTROLLED (111) CRYSTAL FACE EXPOSURE

(75) Inventors: Bing Zhou, Cranbury, NJ (US); Michael Rueter, Plymouth Meeting, PA (US)

(73) Assignee: Morgan Stanley & Co. Incorporated, New York, NY (US)

Reexamination Request:
No. 90/007,642, Jul. 21, 2005

Reexamination Certificate for:
Patent No.: 6,746,597
Issued: Jun. 8, 2004
Appl. No.: 10/066,289
Filed: Jan. 31, 2002

Certificate of Correction issued Dec. 14, 2004.

(51) Int. Cl.
*C07C 4/12* (2006.01)
*B01J 21/16* (2006.01)
*B01J 23/02* (2006.01)
*B01J 23/40* (2006.01)

(52) U.S. Cl. ............... 208/138; 502/74; 502/84; 502/183; 502/184; 502/185; 502/326; 502/327; 502/328; 502/330; 502/331; 502/332; 502/333; 502/334; 502/335; 502/336; 502/337; 502/338; 502/339; 585/483; 585/485; 585/489

(58) Field of Classification Search .................. None
See application file for complete search history.

(56) References Cited

U.S. PATENT DOCUMENTS

| | | | |
|---|---|---|---|
| 5,178,971 A | * | 1/1993 | Itoh et al. .................. 429/40 |
| 5,338,531 A | | 8/1994 | Chuang et al. |
| 5,846,898 A | | 12/1998 | Chuang et al. |
| 5,925,588 A | | 7/1999 | Chuang et al. |
| 6,090,858 A | | 7/2000 | El-Sayed et al. |
| 6,284,213 B1 | | 9/2001 | Paparatto et al. |
| 6,379,834 B1 | * | 4/2002 | Giallombardo et al. ....... 429/44 |
| 6,528,683 B1 | | 3/2003 | Heidemann et al. |
| 6,551,960 B1 | | 4/2003 | Laine et al. |
| 6,740,615 B1 | | 5/2004 | Zhou et al. |
| 6,776,606 B1 | | 8/2004 | Haskew .................. 431/2 |

OTHER PUBLICATIONS

Ahmadi, et al., "Shape–Controlled Synthesis of Colloidal Platinum Nanoparticles" Science, vol. 272, pp. 1924–1926 (Jun. 28, 1996).

* cited by examiner

*Primary Examiner*—Stephen Stein

(57) ABSTRACT

A noble metal nanometer-sized catalyst composition is described along with the method for preparation of the composition. The crystal face of the catalyst contains a prepronderance of (111) type crystal phase exposure. The crystal phase exposure is controlled by sequestering the noble metal cation before deposition on a catalyst support. Controlled catalyst face exposition combined with the nanometer scale of the catalyst increases the catalyst selectivity and activity, particularly for hydrogenation and dehydrogenation reactions.

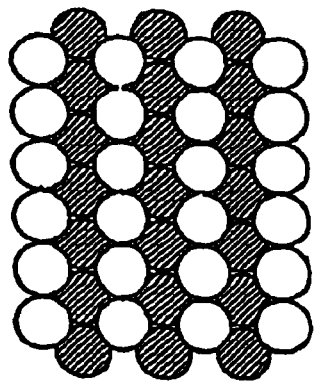 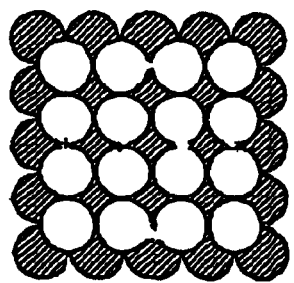 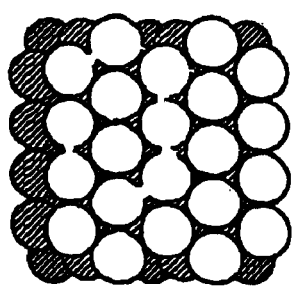

a. (110)   b. (100)   c. (111)

SURFACE STRUCTURE OF DIFFERENT Pd CRYSTAL PHASES

  

FIRST LAYER   SECOND LAYER   THIRD LAYER

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–59 is confirmed.

\* \* \* \* \*